Jan. 5, 1932.  G. W. McKEE  1,840,046
METER CONNECTING DEVICE
Filed March 23, 1929
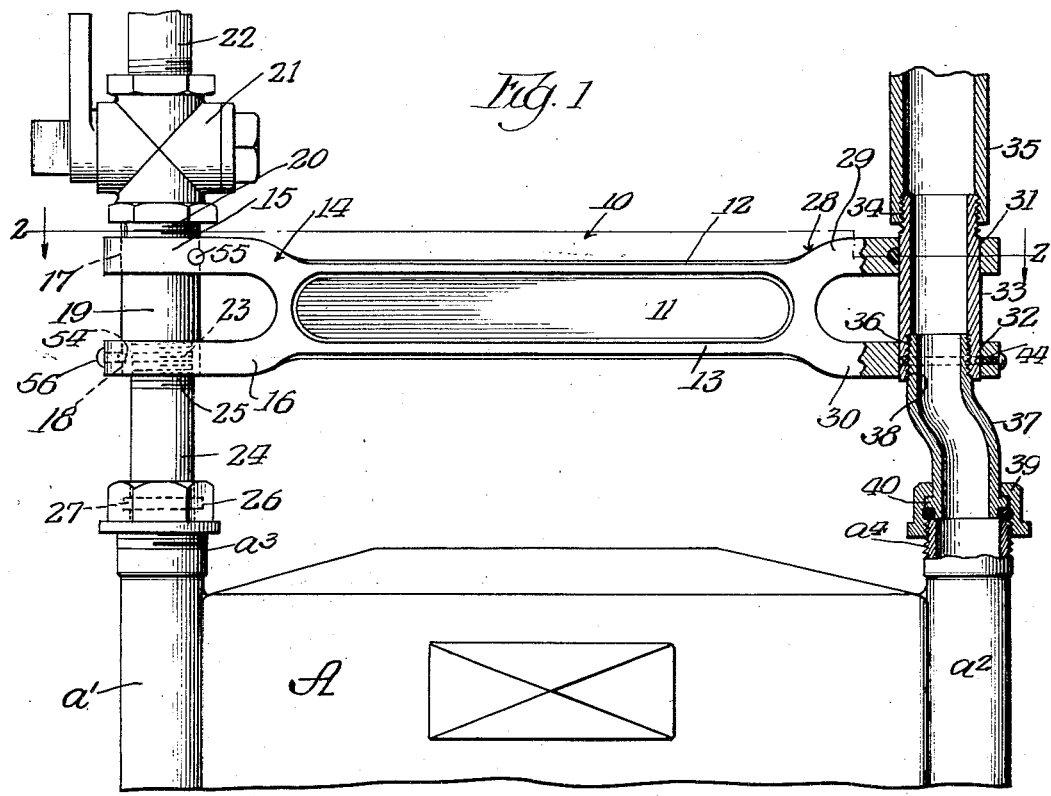
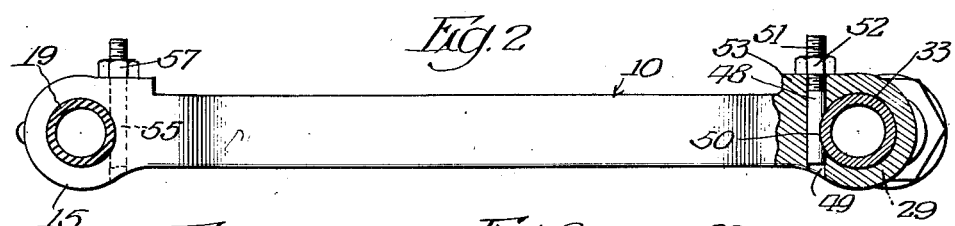
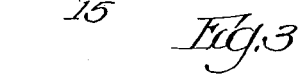 
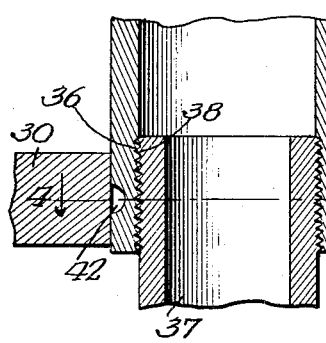 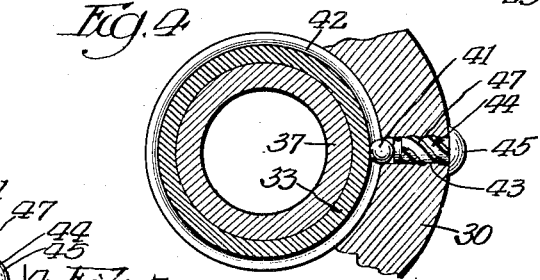
Inventor
Garnet W. McKee
By Fred Gerlach
his Atty.

Patented Jan. 5, 1932

1,840,046

UNITED STATES PATENT OFFICE

GARNET W. McKEE, OF ROCKFORD, ILLINOIS

METER CONNECTING DEVICE

Application filed March 23, 1929. Serial No. 349,373.

The present invention relates generally to devices for use in connecting meters to gas supply and service pipes. More particularly the invention relates to that type of meter connecting device which consists of a rigid or non-adjustable crossbar, a nipple which depends from one end of the bar and embodies a coupling ring at its lower end whereby it may be attached to the inlet tube of the gas meter, and a second depending nipple which is provided at its lower end with a coupling ring whereby it may be attached to the outlet tube of the meter and has its upper end rotatably connected to the other end of the crossbar and offset or otherwise arranged so that the fitter or operator in installing the connecting device may effect the proper position of the coupling rings relatively to the tubes of the meter, simply by rotatively adjusting the second or offset nipple.

In some constructions of meter connecting devices of this character, the second coupling nipple is connected to the end of the crossbar opposite the coupling nipple for the inlet tube of the meter by a sleeve or hollow member which is rotatably mounted in place and has the upper end thereof tapped for connection to the service or gas delivery pipe. It has heretofore been proposed to lock the sleeve against axial displacement and rotation by a set screw, the inner end of which projects into an annular groove in the sleeve. Whereas a set screw of this character effects the desired locking of the sleeve relatively to the crossbar, it none-the-less causes damage to the sleeve in the event that the sleeve is rotated for adjusting purposes without the set screw being first removed or withdrawn from the groove. An additional objection to the use of a set screw for sleeve locking purposes is that the screw might work loose or be withdrawn inadvertently or accidentally and thereby cause injury to the meter as a result of slippage between the sleeve and crossbar.

One object of the present invention is to provide a meter connecting device of the type that embodies a sleeve for rotatably supporting the coupling nipple for the outlet tube of the meter, having sleeve-holding means which is of an improved character and will not cause damage to or an abrading of the sleeve when the latter is rotated for adjustment purposes.

Another object of the invention is the provision of means whereby the aforesaid sleeve locking means is fixedly and permanently held in place when once applied so that the possibility of releasing the sleeve and resultant injury to the meter is wholly avoided.

Another object of the invention is to provide a meter connecting device of the type under consideration having novel means of a readily releasable character for locking the sleeve against rotation, which means need be used only if desired, may be produced at an extremely low cost, and is independent of the means for locking the sleeve against axial displacement relatively to the crossbar.

A further object of the invention is to provide a meter connecting device in which the coupling nipple for the inlet tube of the meter, as well as the nipple for the outlet tube, is connected to a sleeve which is rotatably mounted in the crossbar.

A still further object of the invention is to provide a meter connecting device which is an improvement upon previously designed devices, especially the device disclosed in an application for Letters Patent of the United States filed by me July 5, 1928, Serial No. 290,376, and that disclosed in a second application filed by me October 5, 1928, Serial No. 310,460.

In addition, it is contemplated as one of the objects of the instant invention providing a connecting device which is generally of new and improved construction and in which facility of adjustment of the various parts is combined with durability and compactness of construction.

Other objects of the invention and the various advantages and characteristics of the present construction will be apparent from a consideration of the following detailed description.

The invention consists in the several novel features hereinafter set forth and more particularly defined by the claims at the conclusion hereof.

In the drawings which accompany and form a part of this specification or disclosure and in which like numerals of reference denote corresponding parts throughout the several views:

Figure 1 is a front elevational view of a meter connecting device embodying the invention, the parts adapted for association with the outlet nipple of the meter being shown in section for purposes of illustration;

Figure 2 is a view partly in plan and partly in section, the part in section illustrating the specific construction and arrangement of the means for locking the sleeves against rotation.

Figure 3 is a vertical sectional view disclosing in detail the construction of the means whereby the sleeves for connection to the coupling nipples are locked against axial displacement;

Figure 4 is a horizontal section taken on the line 4—4 of Figure 3; and

Figure 5 is a perspective of the pin that constitutes one of the parts of the means for locking the aforesaid sleeves against rotation.

The invention is exemplified in connection with a gas meter A which may be of any suitable or well known construction and is provided with a vertical inlet tube $a'$ at one side thereof and a vertical outlet tube $a^2$ at the other side. The tubes $a'$ and $a^2$ are generally formed as integral parts of the meter casing and are provided at their upper or distal ends with exterior screw threads $a^3$ and $a^4$ respectively.

The improved connecting device which forms the subject matter of the present invention comprises a rigid or non-adjustable crossbar 10. This bar is preferably formed of a one-piece casting and made of iron. The central portion of the crossbar corresponds in cross section to an I-beam or similar structural element and comprises a vertical web 11, a top flange 12 and a bottom flange 13. The flanges project laterally from both sides of the web and operate to reinforce the bar horizontally. A characteristic and an advantage of utilizing an I-beam formation of this character is that the bar embodies only a minimum amount of metal and it is practically impossible, due to the comparatively small width of the web, to steal gas by drilling a longitudinal cross port through the bar.

The crossbar 10 is provided at one end thereof with a fork 14 which consists of a pair of fork forming members 15 and 16. These members are positioned one above the other and are formed integrally with the flanges 12 and 13 respectively. The member 15 has drilled through the central portion thereof a cylindrical hole or aperture 17. This hole has a vertical axis and is coaxial with a cylindrical hole 18 which is drilled in the lower fork forming member. The holes 17 and 18 are equal in diameter and form top and bottom bearings for a vertically extending sleeve 19. The latter is preferably formed of a standard extra heavy pipe nipple, the outer periphery of which is ground so that it fits accurately and rotates readily in the holes 17 and 18. The upper end of the sleeve 19 projects upwardly of the upper fork forming member 15 and is provided with an external screw thread 20 whereby it is connected to a cock 21. This cock is connected to a gas supply pipe 22 and is operative to control the supply of gas to the meter A through the sleeve 19 and the inlet tube $a'$. The lower end of the sleeve 19 is flush with the lower face of the fork-member 16 and is provided with an internal screw thread 23. A depending coupling nipple 24 is provided at its upper end with an external screw thread 25 which coacts with the screw thread 23 to hold the sleeve 19 and the said nipple in connected relation. A coupling ring 26 engages a flange 27 on the lower end of the nipple 24 and is threaded to engage the screw thread $a^3$ on the inlet tube $a'$ for the purpose of connecting the nipple and the tube and forming a gas tight connection therebetween. By employing a rotatably mounted sleeve as the connecting instrumentality or medium between nipple 24 and the cock, the work of installing or applying the device is greatly facilitated in that it is possible to connect the cock to the gas supply pipe 22 or to connect the cock to the sleeve 19 simply by rotating the latter. The fork forming members 15 and 16 are preferably spaced apart a sufficient distance to permit the central portion of the sleeve 19 to be gripped or engaged by a standard pipe wrench for turning purposes. By having a space of this character, the sleeve 19 need embody no polygonal shoulder or similar turning element and consequently may be made at a low cost and of a standard pipe nipple.

The crossbar 10 is provided at the end opposite the sleeve 19 with a second fork 28. This fork is formed or constructed similarly to the fork 14 and consists of a pair of fork forming members 29 and 30. The latter are provided with coaxial holes 31 and 32 respectively. These holes are equal in diameter and form top and bottom bearings for a vertically extending cylindrical sleeve 33. This sleeve, like the sleeve 19, is preferably formed of a standard extra heavy pipe nipple and is ground so that it fits accurately and rotatably in the holes 31 and 32. The upper end of the sleeve 33 projects upwardly of the upper fork forming member 29 and is provided with an external screw thread 34 whereby it may be connected to a service pipe 35 which is connected to deliver gas from the meter to the various points of consumption. The lower end of the sleeve is substantially flush with the lower face of the fork forming member 30 and is provided with an internal screw thread 36. A coupling nipple 37 serves to connect the sleeve 33 to the outlet tube $a^2$ of the meter. The upper end of this nipple is provided with an external screw thread 38 which engages the internal screw thread 36. A coupling ring 39 engages a flange 40 on the lower end of the nipple 37 and is internally threaded to receive the screw thread $a^4$ on the tube $a^2$. Since it is necessary to provide for variations or changes in the spacing between the coupling rings so that the latter may be made to register with the inlet tube $a'$, the coupling nipple 37 is of the offset or swivel type. By means of this construction it is only necessary when the connecting device is being installed in place to effect an adjustment by rotating the sleeve 33 and correspondingly moving the lower part of the nipple 37 either towards or away from the nipple 24 at the opposite end of the bar. The fork forming members 29 and 30 are spaced apart similarly to the members 15 and 16 so that a pipe wrench may be manipulated around and applied to the central portion of the sleeve 33 for turning purposes.

The sleeve 33 is held in the holes or bearings 31 and 32 against axial displacement by means of a rotatable ball 41, a portion of which fits within an annular groove 42 in the lower end of the sleeve. This ball is located in the inner end of a horizontally extending cylindrical duct or passageway 43 which is formed in the front end of the lower fork forming member 30 and has the outer end thereof closed by a screw device 44. The annular groove 42 is of semi-circular cross section and corresponds in transverse curvature to the periphery of the ball. As a result of using a ball as the locking medium there are no sharp edges which might cut or abrade the sleeve when the latter is rotated for adjusting purposes. In other words, by using a ball to lock the sleeve 33 against rotation, which ball coacts with and rotates in an annular groove in the sleeve of semi-circular cross section, there is no possibility whatsoever of abrading the sleeve during adjustment of the coupling nipple 37. By employing a groove of semi-circular cross section, machining of the sleeve is facilitated. The ball and groove connection 41, 42, exemplifies means of an improved character for locking the sleeve 33 against axial displacement relatively to the crossbar.

The screw device 44 operates to hold the ball 41 against outward movement in the cylindrical duct 43 so that it is at all times in the proper position with respect to the groove 42. This screw device is formed of hardened metal and embodies a head 45 and a shank 46. The latter is of such length that when the head 45 abuts against the end face of the fork forming member 30, the inner end thereof is correctly positioned to prevent the desired outward movement of the ball 41. To prevent the screw device from being removed after it is once applied or inserted into place, the shank 46 embodies spiral or helical threads 47. When the screw device is driven into place, these threads imbed themselves in the wall that forms the duct 43 so as to effect a permanent or non-removable connection. A characteristic and an advantage of securing the screw device 44 permanently in place is that it is impossible to remove, either inadvertently or accidentally, the ball 41, with the result that the sleeve can not be displaced axially relatively to the crossbar, which displacement might tend to spread the inlet and outlet tubes apart and cause damage or injury to the meter. The screw device 44, together with the ball and groove connection, exemplifies means for permanently locking the sleeve to the crossbar so that the sleeve can not be displaced axially.

In some instances, it is desirable to lock the sleeve 33 against rotation so that in effect the nipple 37 is rigidly attached to the crossbar. With this in view, an elongated cylindrical pin 48 is provided. This pin is positioned within a bore 49 which extends laterally through the upper fork forming member 29 and intersects the inner part of the hole 31. The inner end of the pin is provided with an arcuate cutaway portion 50 which conforms in curvature to the hole 31 and is adapted to engage the outer periphery of the sleeve 33, as indicated in Figure 2 of the drawings. The outer end of the pin 48 is provided with an external screw thread 51 on which is mounted a nut 52. This nut is adapted to abut against a flat lug 53 which is formed integrally with one side of the upper fork forming member 21, and when tightened is adapted to draw the pin outwardly so that the arcuate cutaway portion 50 wedges against the sleeve and prevents the latter from rotating relatively to the crossbar. When the nut 52 is loosened, the pin 48 is free to slide longitudinally within the bore 49 and consequently, the cutaway portion 50 exerts no wedging action with respect to the sleeve and the latter may be rotated at will. Since the means for locking the sleeve against rotation consists of but a pin and a nut, it may be produced at an extremely low cost.

The sleeve 19 to which is connected the coupling nipple 24 for the inlet tube $a'$ is locked against axial displacement and rotation relatively to the crossbar 10 by a ball 54 and a pin 55. These members are similar in construction and operation to the ball 41 and the pin 48 respectively. The ball 54 is held in place by a screw device 56 which is of the same character as the screw device 44. The pin 55 is shifted outwardly to effect the desired rotative locking of the sleeve 19 by a nut 57.

In practice, the crossbar 10, the sleeves 19 and 33 and the coupling nipples 24 and 37 are assembled at the factory so as to form a meter connecting device which may be shipped to the user as a unit. In the assembly operation, the pins 48 and 55 are properly positioned within their respective bores so that the sleeves may be slid longitudinally through the holes in the fork forming members. The balls 41 and 54 are then applied and permanently held in place to prevent axial displacement of the sleeves, by driving the screw devices 44 and 57 so that the threads thereof are imbedded in the contiguous metal of the lower fork forming members.

When the sleeves are in their proper position relatively to the crossbar, the nipples 24 and 37 are then applied thereto.

In installing the meter connecting device, the cock 21 is first connected to the screw thread 20 on the upper end of the sleeve 19 and is then connected to the gas supply pipe 22 by rotating it bodily to effect interengagement of the coacting screw threads therebetween. This rotary movement may be effected by applying a pipe wrench between the fork forming members 15 and 16 and rotating the sleeve 19. The external screw thread 34 on the upper end of the sleeve 33 is then connected to the service or gas delivery pipe 35 by rotating the sleeve 33 by means of a pipe wrench inserted between the fork forming members 29 and 30. The sleeve 33 and the nipple 27 are then rotated together until the spacing between the nipples 24 and 37 accurately corresponds to the spacing between the meter tubes $a'$ and $a^2$. After this has been done, it is only necessary to connect the tubes and nipples together by means of the coupling rings 26 and 39. To lock the sleeves 19 and 33 against rotation, the nuts 52 and 58 are tightened. This operation, as previously pointed out, displaces longitudinally the pins 48 and 55 so that the cutaway portions thereof wedge against the outer peripheral parts of the sleeves.

The meter connecting device herein disclosed may be manufactured at a comparatively low cost since the machining of the various parts may be done accurately and economically. It may be readily installed in view of the fact that both coupling nipples are attached to rotatably mounted sleeves. The forks at the ends of the crossbar permit of the use of a pipe wrench when it is desired to turn the sleeves.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A meter connecting device comprising a rigid crossbar provided at one end thereof with means for connection to a pipe, a coupling nipple connected to the means and adapted to communicate with the pipe through said means, a sleeve mounted rotatably in the other end of the crossbar, said sleeve being provided at one end thereof with means for connection to a second pipe and having formed in the outer periphery thereof an annular groove, a coupling nipple connected to the other end of the sleeve and adapted to communicate with said second pipe through the sleeve, means permanently associated with the crossbar and extending into the groove in the sleeve for preventing axial movement of the sleeve relatively to the crossbar but permitting of rotation of the sleeve, and releasable means independent of the last mentioned means and carried by the crossbar for engaging the sleeve and locking the latter against rotation relatively to the bar.

2. In a meter connecting device, the combination of a rigid crossbar provided at one end thereof with means for connection to a pipe, a coupling nipple connected to the means and adapted to communicate with the pipe through said means, a fork at the other end of the crossbar consisting of a pair of members disposed one opposite the other and having coaxial holes formed therein, a sleeve extending through and rotatable in the holes and provided at one end thereof with means for connection to a second pipe, a coupling nipple connected to the other end of the sleeve and adapted to communicate with the said second pipe through the sleeve, means carried by one of the fork-members for securing the sleeve against axial displacement relatively to the crossbar, and releasable means carried by the other fork forming member for locking the sleeve against rotation.

3. A connection of the character described for connecting the inlet and outlet tubes of a gas meter to the lower ends of a pair of vertical pipes without strain being imparted to the tubes by the pipes, comprising in combination a rigid, one-piece crossbar adapted to extend horizontally and having a vertical, substantially cylindrical hole extending through each end thereof, a pair of vertical, substantially cylindrical sleeves with open ends disposed in and fitted to the holes respectively and confined to rotate on fixed vertical and parallel axes, said sleeves being provided at the upper ends thereof with screw threads for direct connection to the lower ends of the pipes and being adapted to be connected to the pipes by rotation relatively thereto, means associated with the ends of the crossbar for holding the sleeves against axial displacement in the holes, and a pair of coupling nipples connected to and depending from internal screw threads in the lower ends of the sleeves and provided with means at the lower ends thereof for connection to the tubes of the meter.

Signed at Chicago, Illinois, this 21st day of March, 1929.

GARNET W. McKEE.